June 22, 1965  J. P. HOCKER  3,191,004
ELECTRICALLY HEATED IMMERSIBLE WARMING UNIT
Filed Oct. 12, 1962
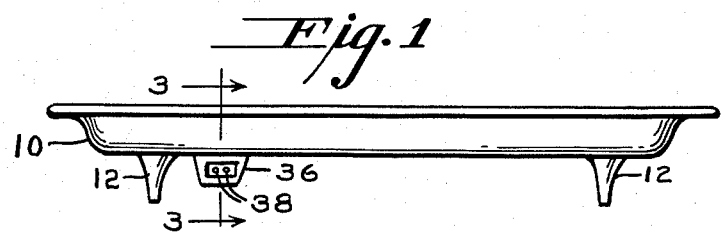
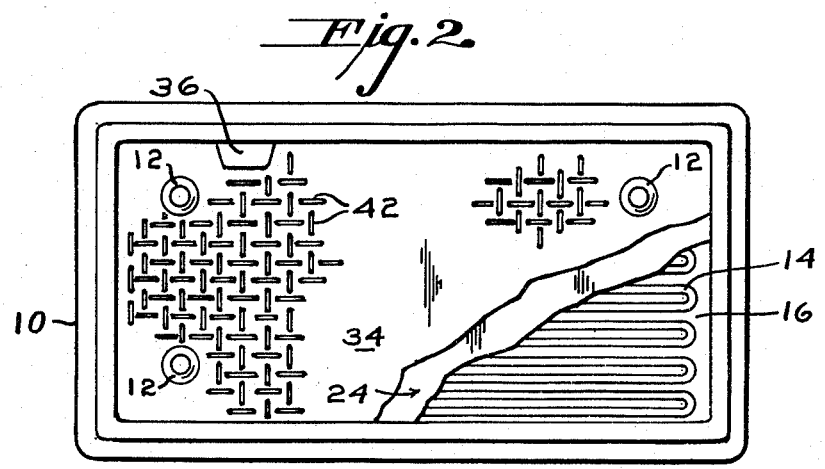
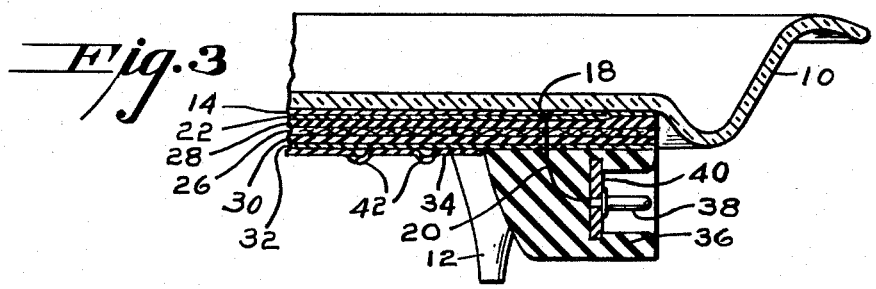
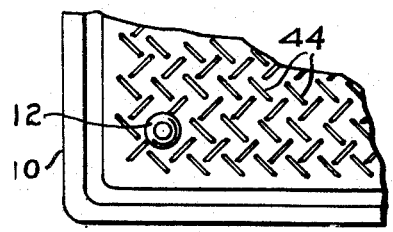
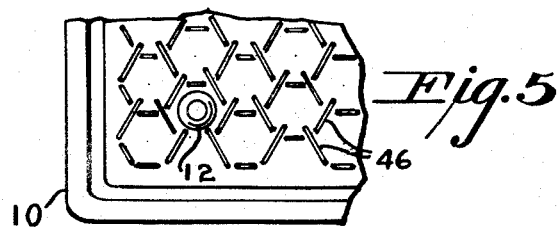
INVENTOR.
JAMES P. HOCKER
BY Clarence R. Patty Jr.
ATTORNEY

United States Patent Office 3,191,004
Patented June 22, 1965

3,191,004
ELECTRICALLY HEATED IMMERSIBLE
WARMING UNIT
James P. Hocker, Corning, N.Y., assignor to Corning
Glass Works, Corning, N.Y., a corporation of New
York
Filed Oct. 12, 1962, Ser. No. 230,127
8 Claims. (Cl. 219—461)

This invention relates to warming units and more particularly to electrically heated immersible food warming platters but is in no way limited to such applications.

Food warming platters are generally employed at a dining table for placing thereon containers or plates of food or the food itself, to maintain said food at substantial serving temperature until served.

Heretofore, food warming platters generally comprised non-immersible units. Food spilled, dripped, or otherwise disposed on the platter would have to be carefully wiped to prevent damage to the electrical heating means employed therein. Another problem with prior art units was heat radiation from the platter to the table. This radiation would be of an intensity such that table top wood finishes and the like were caused to become marred.

An object of the present invention is to provide a fully immersible food warming platter.

Another object of this invention is to provide improved means and method for making electric heating units impervious to moisture.

Still another object is to provide an improved means and method for reducing radiation of heat from a hot body.

A further object is to provide a means and method for counteracting the variation of thermal expansion between two adherently bonded materials having greatly varying temperature coefficients of expansion.

Broadly, according to the invention, an immersible electric warming unit is formed comprising a plate of low expansion ceramic material embodied in a shallow walled shell whose interior bottom surface is adapted for the support of food or food serving containers, a heating element adhered to the exterior bottom surface of said plate, inner electrical terminals embodying lead wires, said inner terminals being electrically connected to said heating element, a moisture impervious and electrically insulating structure bonded to said heating element and the surrounding exterior bottom surface, a sheet of low infrared emissivity material bonded to said insulating structure, said sheet having a pattern of discontinuous ridges formed thereon, said pattern being such that alternate ridges are at greatly differing angles, outer electrical terminals electrically connected to the inner electrical terminals, and a housing of moisture impervious electrically insulating material, said housing being molded about said lead wires and a portion of said outer terminals and bonded to said insulating structure.

Additional objects, features, and advantages of the present invention will become apparent, to those skilled in the art, from the following detailed description and the attached drawing on which, by way of example, only the preferred embodiments of this invention are illustrated.

FIG. 1 is a side elevation of the warming platter of this invention.

FIG. 2 is a cutaway bottom view of the warming platter of this invention.

FIG. 3 is a view along 3—3 of FIG. 1.

FIG. 4 is a fragmentary bottom view of the warming platter of this invention.

FIG. 5 is another fragmentary bottom view of the warming platter of this invention.

In the drawings, an immersible electric warming platter is illustrated wherein the body is formed of low expansion ceramic material in the form of a shallow walled shell 10 supported on legs 12.

An electrical heating element 14 is adhered to the exterior bottom surface 16 of said shell, said heating element being smaller than said bottom surface thereby forming an exposed border on said surface. For one example of a suitable heating element and method of application thereof, reference is made to copending application by H. F. Dates, Serial No. 142,980. Inner electrodes 18, embodying lead wires 20, are attached to the respective ends of said heating element 14 by any suitable method well known in the art, such as soldering, or the like. A film of suitable adhesive 22 is applied to element 14 and the exposed portion of surface 16 for the bonding thereto of structure 24. Structure 24 is applied substantially coextensively with the bottom surface 16, thereby extending beyond heating element 14. Preferably structure 24 comprises at least one layer of high dielectric material 26 such as a sheet of woven glass fibers, or the like, sandwiched between sheets of moisture impervious material 28 and 30, such as silicone rubber, viton, rubber, or the like. Structure 24 may also be formed of a single layer of electrically insulating and moisture impervious material such as silicone rubber. Another film 32 of suitable adhesive is then applied over said structure 24. Suitable adhesives such as room temperature vulcanizable (RTV) silicone adhesives, flexible epoxies, and the like are well known in the art and can be readily selected, by one familiar with the art, for the particular insulating structure materials employed.

A sheet 34 of low infrared emissivity material is disposed adjacent film 32, said sheet having openings therein to accommodate legs 12 and terminal housing 36. Suitable low infrared emissivity materials are metals such as aluminum and the like. Legs 12 are bonded directly to said structure 24 by said adhesive 32.

Outer electrodes 38, mounted on terminal board 40, are electrically connected to said heater element by means of lead wires 20. Housing 36 is molded about terminal strip 40, leads 20 and inner electrodes 18, and is bonded to structure 24 in a moisture impervious manner. An example of a suitable housing material is silicone rubber.

Since most suitable low infrared emissivity materials are metals having high thermal expansions, and shell 10 is of low expansion material, it has been found difficult to bond sheet 34 without subsequent bond failure when the unit is heated. It has been discovered that by forming a pattern of discontinuous ridges 42 on plate 34, with alternate ridges being at greatly differing angles, such for example as perpendicular to each other, sheet 34 remains rigidly bonded with change of temperature. Said ridges 42 act as hinges and each ridge absorbs the expansion of sheet 34 in the immediate vicinity of said ridge, thereby the overall size of sheet 34 remains substantially the same with the thermal expansion thereof being substantially absorbed by said ridges.

It has been found that ridges having a length of approximately one-half to one inch and a pattern where each ridge is interrupted by a non-intersecting cross ridge such as is illustrated in FIG. 2, is particularly suitable for the warming platter of this invention. Ridges having a length much longer than one inch will cause unduly high stresses within the sheet, since they do not absorb the sheet expansion parallel to their direction. Ridges less than one-half inch long are more difficult to form although they function well. For each ridge to act as a hinge for absorbing said sheet expansion surrounding each ridge, alternate ridges must be at greatly differing angles. It has been found that a suitable pattern of ridges is one where a straight line in any direction across said pattern of ridges will intersect said ridges at distance intervals of approximately twice the length of said ridges or less. Other ridge patterns such as a herringbone pattern 44 illustrated in FIG. 4 and a hexagonal pattern 46 illustrated in FIG. 5 or the like, are also suitable.

It has been found that perforating sheet 34, for example, forming small holes at the ends of said ridges, further reduces the stresses in said sheet. Such perforations are also suitable for allowing products, released as a result of curing said adhesives, to be removed.

Another method may be employed for forming the warming platter of this invention. Structure 24 may be formed from a layer of dielectric material sandwiched between sheets of raw uncured silicone rubber or the like and thereafter assembled, as heretofore described, without the use of an adhesive. Subsequent curing, by placing the assembly so formed in a vacuum bag and thereafter applying heat and pressure thereto to cure said rubber, causes the insulating structure to bond to the shell and sheet 34 to bond to the insulating structure. Thereafter legs 12 and housing 36 may be attached as heretofore described.

The electrically heated food warming platter of this invention provides for warming of foods without marring of commercial table finishes and without separation of the sheet of low infrared emissivity material from the low thermal expansion material shell. In addition, the platter is fully immersible in water with commercial soaps and detergents for dishwashing purposes.

Although the present invention has been described with respect to specific details of certain embodiments thereof, it is not intended that such details be limitations upon the scope of the invention except insofar as set forth in the following claims.

What is claimed is:

1. An immersible electric warming unit comprising a plate of low expansion ceramic material embodied in a shallow-walled shell whose interior bottom surface is adapted for the support of food serving containers, a heating element adhered to the exterior bottom surface of said shell, moisture impervious and electrically insulating means bonded to said heating element, heat insulating means bonded to said moisture impervious means, and impervious electrical terminal means, said terminal means being electrically connected to said heating element.

2. An immersible electric warming unit comprising a plate of low expansion ceramic material embodied in a shallow-walled shell whose interior bottom surface is adapted for the support of food serving containers, a heating element adhered to the exterior bottom surface of said shell, inner electrical terminals embodying lead wires, said inner terminals being electrically connected to said heating elements, an impervious electrically insulating layer bonded to said heating element and surrounding exterior bottom surface, a sheet of low infrared emissivity material bonded to said insulating layer, said sheet having a pattern of discontinuous ridges formed thereon, said pattern being such that each ridge is interrupted by a cross ridge and that a straight line in any direction across the surface of said sheet will intersect said ridges at distance intervals less than twice the length of said ridges, outer electrical terminals electrically connected to said inner electrical terminals, and a housing of impervious electrically insulating material, said housing being molded about said lead wires and a portion of said outer electrical terminals and bonded to said insulating layer.

3. The immersible electric warming unit of claim 2 wherein said impervious electrically insulating layer comprises a sheet of woven glass fibers sandwiched between sheets of silicone rubber.

4. The immersible electric warming unit of claim 2 wherein said sheet of low infrared emissivity material is metallic.

5. The immersible electric warming unit of claim 4 wherein said sheet of low infrared emissivity material is aluminum.

6. The immersible electric warming unit of claim 2 wherein said ridges have a length ranging from approximately one-half inch to approximately one inch.

7. The immersible electric warming unit of claim 2 wherein said pattern is selected from the group consisting of herringbone, hexagonal and alternating ridges substantially perpendicular to each adjacent ridge.

8. An immersible electric warming unit comprising a plate of low expansion ceramic material embodied in a shallow-walled shell whose interior bottom surface is adapted for the support of food serving containers, a heating element adhered to the exterior bottom surface of said shell, inner electrical terminals embodying lead wires, said inner terminals being electrically connected to said heating element, a first film of adhesive disposed on said heating element and surrounding exterior bottom surface, an impervious electrically insulating layer comprising a sheet of woven glass fibers sandwiched between sheets of silicone rubber disposed adjacent said adhesive and substantially coextensively therewith, a second film of adhesive disposed on said layer, a sheet of aluminum bonded to said layer by means of said second film, said sheet of aluminum having a pattern of substantially equal length discontinuous ridges formed thereon, said pattern having substantially each ridge interrupted by a non-intersecting cross ridge, said ridges being disposed so that a straight line in any direction across said pattern will intersect said ridges at distance intervals less than twice the length of an individual ridge, outer electrical terminals electrically connected to said inner electrical terminals, and a housing of silicone rubber molded about said lead wires and a portion of said outer electrical terminals, said housing being bonded to said layer.

References Cited by the Examiner
UNITED STATES PATENTS

| | | | |
|---|---|---|---|
| 964,624 | 7/10 | Doran | 118—116 |
| 1,856,898 | 5/32 | Wood | 80—60 |
| 2,255,466 | 9/41 | Jenkins | 219—521 |
| 2,276,005 | 3/42 | Vouvalidis | 99—422 |
| 2,572,163 | 10/51 | Lamb | 219—463 |
| 2,945,114 | 7/60 | Mathews | 219—438 X |
| 3,026,604 | 3/62 | Boggs | 29—155.63 |
| 3,031,739 | 5/62 | Boggs | 29—155.63 |
| 3,141,090 | 7/64 | Batcher | 219—438 X |

RICHARD M. WOOD, *Primary Examiner.*